United States Patent Office 2,951,979
Patented Sept. 6, 1960

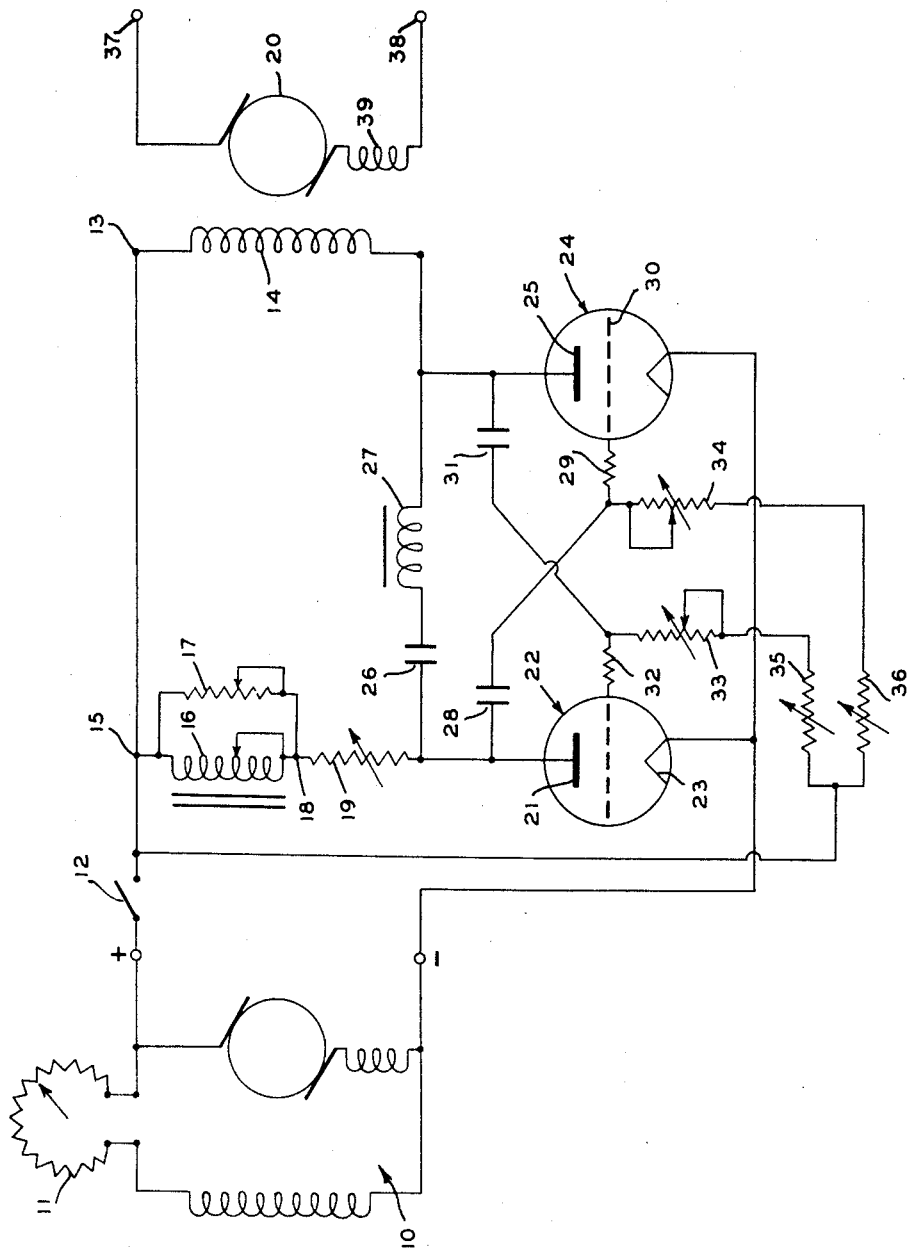

2,951,979

GENERATOR CONTROL FOR ELECTRO-FISHING

John W. Van Dyke, Seattle, Wash., assignor, by mesne assignments, to Thor P. Ulvestad and David T. Dickson Filed July 8, 1955, Ser. No. 520,816
23 Claims. (Cl. 322—37)

The present invention relates to the direction and control of fish and other marine organisms by the application of uni-directional pulses of current. In accordance with the invention, the uni-directional pulses of current are produced by a direct current generator and the duration and frequency of these pulses are controlled to be effective for the intended purpose.

It is known that certain varieties of fish can be attracted by means of a constant electric current. It is also known that fish can be repelled by a pulsating electric current produced by the intermittent discharge of a capacitor.

The present invention is based on the discovery that fish can be guided by a uni-directional pulsating current which is effective to guide fish over a wider area and at a smaller consumption of electric current than can be obtained using a constant electric current. Also by suitable variation of pulse frequency and duration, the invention can be made effective against a greater variety of fish and more effective against particular varieties of fish than is possible using a constant electric current.

In accordance with the invention, the supply of electric current to a direct current generator is controlled by a split-load inverter in which two arc type rectifier valves have their anodes connected through a capacitor so that the firing of one of the rectifier valves extinguishes the other valve. Only one of the valves supplies current to the field windings of a generator so that the flow of current in the windings and hence in the electrodes supplied by the generator is uni-directional. The use of a generator to supply current to the electrodes enables a very large increase in the amount of power which can be supplied to the electrodes. Thus, the main generator of the invention can have an effective power amplification of over 70 times to greatly increase the power which can be supplied while utilizing a single pulsing circuit.

The invention includes the provision of suitable controls so that the frequency of firing as well as the duration thereof can be adjusted to produce a frequency and duration of greatest effectiveness in the control of various species of fish. Also, provision is made for the adjustment of other circuit constants to produce a wave form appropriate for any particular type of fish.

Other and further features of the invention will be apparent from the description which follows in conjunction with the accompanying drawing in which the invention is illustrated in the circuit diagram forming the single figure thereof.

In the embodiment shown in the drawing, the numeral 10 generically designates a source of direct current having a sufficient and variable voltage and current capability. In the drawing, the source of direct current is shown as a compound wound generator dynamo provided with a field rheostat 11 so that the output voltage of the generator may be varied. It will be appreciated, however, that other sources of direct current, such as a rectifier filter combination or a battery of primary or secondary voltaic cells may be employed in place of the compound wound generator dynamo illustrated. In order to distinguish the generator 10 from the main generator to be later described, the generator 10 will be hereinafter termed the exciter.

The positive terminal of the exciter 10 is connected through a switch 12 to one terminal 13 of the field windings 14 of a generator of high current output 20, the generator 20 being hereafter referred to as the main generator. The positive terminal of the exciter 10 is also connected to one terminal 15 of an adjustable inductor 16 which may be shunted by an adjustable resistor 17. The other terminal 18 of the inductor 16 is connected through a variable resistor 19 to the anode 21 of a rectifier valve 22 which is shown in the drawing as a thyratron. The cathode 23 of the valve 22 is connected to the negative terminal of the exciter 10.

A second rectifier valve 24, also shown as a thyratron, is provided, the valve 24 having an anode 25. Anodes 21 and 25 of the valves 22 and 24 are connected together through a capacitor 26 and a small inductor 27, the capacitor being preferably adjustable. The anode 21 is also connected to a capacitor 28 which connects, through a resistor 29, with the control element or grid 30 of the valve 24. In the same manner, anode 25 is connected through the capacitor 31 and the resistor 32 to the grid of valve 22.

The juncture of capacitor 31 and resistor 32 is connected through resistors 33 and 35 to the positive terminal of the exciter 10 and the juncture of capacitor 28 and resistor 29 is also connected through the resistors 34 and 36 to this same terminal. The resistors 33 and 34 are ganged in such a way that increase in the resistance of one of the resistors will decrease the resistance of the other. Resistors 35 and 36 are ganged so that they will increase or decrease simultaneously.

The main generator 20 supplies current to the electrodes 37 and 38 and series windings or interpoles 39 are preferably provided to facilitate good commutation. The main generator 20 is preferably selected to be of large size and to possess a low resistance field and low inductance either in series or in parallel with the field windings.

The device shown in the drawing operates in the following manner. When both generators are being rotated by an appropriate prime mover, and with the switch 12 closed, the voltage at the anodes of valves 22 and 24 starts to rise toward the exciter potential. At the same time, the potential of the grids also starts to rise. At some time then, the combination of anode and grid potentials on either of the valves 22 or 24 is such as to cause the tube to start to conduct or "fire." Assuming that valve 24 fires first, current will flow through the field windings 14 of the main generator 20 and will induce a corresponding current in the windings of the armature thereof.

Valve 24 having fired, the potential of its anode 25 drops to a low value (in the range of 8–25 volts depending upon the type of valve) and this drop of voltage in the anode 25 is transmitted to the anode 21 of valve 22 through the capacitor 26. The drop in voltage of the anode 25 is also transmitted to the grid of valve 22 through the capacitor 31. After this drop in voltage of the anode and grid in the valve 22, the potentials of the anode and grid start to rise again. After an interval of time which is dependent on the characteristics of the circuit, the valve 22 will fire and the potential on anode 21 will drop from some high value to the conduction value. This drop in potential is transmitted to the anode 25 and the grid 30 of the valve 24 through the capacitors 26 and 28.

Since the potential on anode 25 was only a few volts above the potential on the cathode of valve 24 prior to the firing of the valve 22, the drop in potential occasioned in the anode 25 because of the firing of the valve 22 causes the valve 24 to cease conducting. This cuts off the current through the generator field windings 14 abruptly and the potential surge produced is absorbed in capacitor 26 and inductor 27.

Since the grid 30 of valve 24 is now negative in charge, it will remain non-conducting until the charge on the capacitor 28 leaks off through the resistors 34 and 36. When valve 24 fires again, it will cause the valve 22 to cease conducting in the same manner as the firing of valve 22 caused the valve 24 to cease conducting and the valves 22 and 24 will continue to fire in this manner alternately. In this manner, pulses of current are produced in the field windings 14 as well as in the main generator 20 and the electrodes 37 and 38. Since only the valve 24 supplies current to the field windings 14, the flow of current in the field windings is uni-directional.

The resistors 32 and 29 function to limit the current in the grids of the valves 22 and 24. The frequency of firing is controlled by the resistors 35 and 36 and the relative time of conduction of the two valves, and therefore the length of the current pulse in the field windings 14, is controlled by the setting of resistors 33 and 34.

It will thus be apparent that in accordance with the invention, a pair of valves of the arc type are supplied with direct electrical current and one of the valves has as its load the field windings of a generator while the other valve has as its load a variable impedance. Each of the loads is connected to one terminal of the source of direct electrical current and the circuits for each load are completed through the valves to the other terminal of the source of direct electrical current.

The foregoing is coupled with means to fire the valves alternately and to vary the frequency and spacing of the firing.

The invention has been illustrated by a device in which the anode circuit of one valve has as its load the field windings of a generator while the anode circuit of the other valve has as its load a variable impedance. The loads are shown as being connected to the positive terminal of the source of direct electrical current and the cathodes of each valve are connected to the negative terminal of the source of direct electrical current. It is desired to state that the valves can be connected in the reverse manner to that illustrated. In other words, the loads can be placed in the cathode circuits and joined to the negative terminal of the source of direct electrical current.

Further, in the device illustrated alternate firing of the valves is produced by an interconnection between the anodes of each of the valves. It will be appreciated that the alternate firing of the valves can be achieved by separately producing alternate firing pulses.

In accordance with the invention, fish are guided toward the anode electrode and swarm therearound. This result can be utilized in many ways to facilitate the catching of fish and the present invention is not to be construed as limited to any particular means of catching the fish which have been guided. Thus, guiding of fish in accordance with the invention may be accompanied by catching procedures utilizing, for example, nets, hydraulic pumps, etc.

Further, the invention provides a highly efficient and effective system for producing uni-directional pulsating current as well as for adjusting the frequency and duration of these pulses and the present invention is not to be construed as limited to any particular manner of using the system.

For the purpose of illustrating the invention, the invention will now be described with reference to its applicability in the guiding of herring, length 3–4 inches. It has been found that pulses having a duration of .04 to .08 second and a frequency of 10–12 pulses per second are effective. Fish within a distance of 10 feet from the anode electrode will be guided thereto using a peak pulse voltage of 100 volts. It has also been found that fish over a volume of 2000 cubic feet surrounding the anode electrode will be affected with a current consumption of 14 kilowatts per hour.

The duration and frequency as well as the strength of the uni-directional pulses may vary considerably depending upon the type and size of fish which it is desired to direct. It has been found that pulses having a duration of between approximately .001 to .5 second and a frequency of between approximately 1 to 60 pulses per second together with a voltage change during the pulse of between approximately 5 millivolts to 5 volts per centimeter are satisfactory, it being understood that various combinations of the foregoing will be preferred depending upon the fish sought.

I claim:

1. A device for directing the movement of fish and other marine organisms which comprises a source of direct electrical current, a pair of valves of the arc type, one valve having as its load the field windings of a direct current generator and the other valve having as its load a variable impedance, said loads being connected to the same terminal of the source of direct electrical current, and means to fire said valves alternately.

2. A device as recited in claim 1 in which said generator is of large size and possesses a low resistance field and low inductance when connected with said field windings either in series or in parallel.

3. A device as recited in claim 1 in which said generator includes an interpole to induce commutation.

4. A device as recited in claim 1 in which means are provided to adjust the frequency and spacing of the firing of said valves.

5. A device as recited in claim 1 in which the frequency of firing of each valve is independently controlled.

6. A device for directing the movement of fish and other marine organisms which comprises a source of direct electrical current, a pair of valves of the arc type, the anode circuit of one valve having as its load the field windings of a direct current generator and the anode circuit of the other valve having as its load a variable impedance, said loads being connected to the positive terminal of the source of direct electrical current and the cathodes of said valves being connected to the negative terminal thereof, a capacitor joining the anodes of said valves, means to fire said valves alternately and means to adjust the frequency and spacing of such firing.

7. In a device for producing a series of unidirectional pulses of electrical current, the improvement which comprises a pair of valves of the arc type, one of said valves having as its load the field windings of a generator and the other of said valves having as its load a variable impedance, said loads being connected to the same terminal of a source of direct electrical current, means including a capacitor joining the anodes of said valves, means for transmitting a drop in potential from the anode and grid of each valve to the grid and anode respectively of the other valve and means including a variable resistor interposed between the grid of each valve and the said terminal of the said source of direct electrical current to which said loads are connected.

8. A device as recited in claim 7 in which a pair of variable resistors is interposed between the grid of each valve and the said terminal of the source of direct electrical current, one resistor of each of said pairs of resistors being ganged together so that increase in one resistor will effect a decrease in the other resistor and the other resistor of each of said pairs of resistors being ganged together to increase and decrease simultaneously.

9. A device as recited in claim 7 in which said variable impedance includes an adjustable inductor and an adjustable resistor shunted thereacross.

10. A device as recited in claim 7 in which said means for transmitting a drop in potential from the anode and grid of each valve to the grid and anode respectively of the other valve includes a capacitor and a resistor interposed between each grid and each anode.

11. A device for directing the movement of fish and other marine organisms which comprises a compound wound generator for supplying direct electrical current, a pair of valves of the arc type, one valve having as its load the field windings of a generator and the other valve having as its load a variable impedance, said loads being connected to the same terminal of the source of direct electrical current, a capacitor and an inductor connecting the anodes of said valves, a capacitor and a resistor connecting the anodes of each of said valves with the grids of the other of said valves, pairs of resistors connecting the grids of each of said valves with the positive terminal of the source of direct electrical current and the cathodes of each of said valves being connected to the negative terminal of the source of direct electrical current.

12. Pulse producing means comprising a source of direct electrical current, a pair of valves of the arc type, one of said valves being electrically connected to an electrical load and the other of said valves having as its load a variable impedance, said loads being connected to the same terminal of the source of direct electrical current, and means to fire said valves alternately.

13. Pulse producing means as recited in claim 12 in which means are provided to adjust the frequency and spacing of the firing of said valves.

14. Pulse producing means as recited in claim 12 in which the anode circuit of one of said valves is joined to the anode circuit of the other of said valves through a capacitor and means are provided to adjust the frequency and spacing of the alternate firing of said valves.

15. Pulse producing means as recited in claim 14 in which means are provided for transmitting a drop in potential from the anode and grid of each valve to the grid and anode respectively of the other valve and means including a variable resistor are interposed between the grid of each valve and the terminal of said source of direct electrical current to which said loads are connected.

16. Pulse producing means as recited in claim 15 in which a pair of variable resistors is interposed between the grid of each valve and the said terminal of the source of direct electrical current, one resistor of each of said pairs of resistors being ganged together so that increase in one resistor will effect a decrease in the other resistor and the other resistor of each of said pairs of resistors being ganged together to increase and decrease simultaneously.

17. Pulse producing means as recited in claim 12 in which said variable impedance includes an adjustable inductor and an adjustable resistor shunted thereacross.

18. Pulse producing means as recited in claim 15 in which said means for transmitting a drop in potential from the anode and grid of each valve to the grid and anode respectively of the other valve includes a capacitor and a resistor interposed between each grid and each anode.

19. Pulse producing means as recited in claim 15 in which the anodes of said valves are connected together through an inductor in addition to said capacitor and the anodes of each of said valves are connected to the grids of the other of said valves through a capacitor and a resistor.

20. A device for producing spaced uni-directional electrical pulses with off periods between said pulses comprising a source of continuous direct current, a direct current generator having field windings, said field windings defining a first electrical load, a second electrical load, means to automatically alternately direct said direct current through said first and second loads to produce in said field windings spaced uni-directional electrical pulses with off periods between said pulses.

21. A device as recited in claim 20 wherein said second load is a variable impedance.

22. A device as recited in claim 20 including means to independently vary the frequency and duration of said pulses.

23. A device for producing spaced uni-directional electrical pulses with off periods between said pulses comprising a source of continuous direct current, means to automatically convert said continuous direct current into a series of spaced uni-directional pulses with off periods between said pulses, a direct current generator having field windings, means to direct said pulses through said field windings, and means to independently vary the frequency and duration of said pulses.

References Cited in the file of this patent

UNITED STATES PATENTS

| | | |
|---|---|---|
| 1,061,375 | Heany | May 13, 1913 |
| 2,233,045 | Bonner et al. | Feb. 25, 1941 |
| 2,300,515 | Ludwig | Nov. 3, 1942 |
| 2,335,675 | Holters et al. | Nov. 30, 1943 |
| 2,440,935 | Dewan | May 4, 1948 |

FOREIGN PATENTS

| | | |
|---|---|---|
| 176,096 | Great Britain | Feb. 27, 1922 |
| 560,180 | Great Britain | Mar. 23, 1944 |
| 693,229 | Great Britain | June 24, 1953 |